(12) United States Patent
Fujii et al.

(10) Patent No.: US 12,454,343 B2
(45) Date of Patent: Oct. 28, 2025

(54) STEERING ASSISTANCE SYSTEM

(71) Applicant: HONDA MOTOR CO., LTD., Minato-ku (JP)

(72) Inventors: Satoshi Fujii, Wako (JP); Yoshiyuki Misumi, Wako (JP); Yuta Toma, Wako (JP); Toru Kawai, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 155 days.

(21) Appl. No.: 18/239,848

(22) Filed: Aug. 30, 2023

(65) Prior Publication Data
US 2025/0074570 A1 Mar. 6, 2025

(51) Int. Cl.
*B63H 25/04* (2006.01)
*B63B 49/00* (2006.01)
*B63B 79/10* (2020.01)
*B63B 79/40* (2020.01)
*G06T 7/70* (2017.01)
*G06T 11/00* (2006.01)
*G08G 3/00* (2006.01)
*H04N 7/18* (2006.01)

(52) U.S. Cl.
CPC .............. *B63H 25/04* (2013.01); *B63B 49/00* (2013.01); *B63B 79/10* (2020.01); *B63B 79/40* (2020.01); *G06T 7/70* (2017.01); *G06T 11/001* (2013.01); *G08G 3/00* (2013.01); *H04N 7/183* (2013.01); *G06T 2207/30204* (2013.01)

(58) Field of Classification Search
CPC ......... B63H 25/04; B63B 49/00; B63B 79/10; B63B 79/40; G06T 7/70; G06T 11/001; G06T 2207/30204; G08G 3/00; H04N 7/183
See application file for complete search history.

(56) References Cited

U.S. PATENT DOCUMENTS 11,505,292 B2 * 11/2022 Johnson ................ G01S 13/862
2009/0303024 A1 * 12/2009 Asari ..................... B60Q 1/484
340/425.5

(Continued)

*Primary Examiner* — Fernando Alcon
(74) *Attorney, Agent, or Firm* — Amin, Turocy & Watson, LLP

(57) ABSTRACT

Provided is a steering assistance system including a determination unit determining whether or not a positional relationship between an object around a waterborne moving body and the waterborne moving body satisfies a predetermined condition on the basis of a result of processing an image captured by an imager capturing an image around the waterborne moving body, and a display control unit causing a display to display an image in which one or more virtual lines are superimposed on the image if the predetermined condition is determined to be satisfied, in which each of the one or more virtual lines is associated with one of at least four or more regions set to the front, rear, left, and right of the waterborne moving body, the determination unit determines whether or not the predetermined condition is satisfied for each of the regions, and the display control unit causes the display not to display the virtual line corresponding to a specific region if the predetermined condition is satisfied in the specific region, and causes the display to display the virtual line corresponding to a non-specific region if the predetermined condition is satisfied in the non-specific region.

19 Claims, 10 Drawing Sheets

(56) References Cited

U.S. PATENT DOCUMENTS

| | | | | |
|---|---|---|---|---|
| 2013/0110329 A1* | 5/2013 | Kinoshita | ............ | G05D 1/0206 |
| | | | | 367/107 |
| 2017/0195567 A1* | 7/2017 | Hsu | ........................ | B60Q 9/008 |
| 2018/0229587 A1* | 8/2018 | Gao | .................... | B60H 1/00357 |
| 2018/0301029 A1* | 10/2018 | Nilsson | .................. | G06V 20/58 |
| 2018/0308275 A1* | 10/2018 | Fortmann | ............ | G05D 1/0094 |
| 2020/0223482 A1* | 7/2020 | Maruoka | ................ | H04N 7/183 |
| 2020/0275036 A1* | 8/2020 | Kurokawa | ............. | H04N 7/181 |
| 2020/0298941 A1* | 9/2020 | Terada | ................... | H04N 23/90 |
| 2020/0369351 A1 | 11/2020 | Behrendt et al. | | |
| 2020/0398822 A1* | 12/2020 | Hara | ................ | B60W 30/0956 |
| 2020/0398824 A1* | 12/2020 | Tsujino | ............. | B60W 60/0025 |
| 2021/0081684 A1* | 3/2021 | Yamamoto | ......... | B62D 15/0275 |
| 2021/0179173 A1* | 6/2021 | Yamanaka | ........... | B62D 15/029 |
| 2021/0261226 A1* | 8/2021 | Johnson | .................. | B63B 79/15 |
| 2022/0084458 A1* | 3/2022 | Sakuma | ................ | G02B 27/01 |
| 2022/0303505 A1* | 9/2022 | Itoh | ........................... | G06T 7/50 |
| 2023/0144543 A1* | 5/2023 | Dake | ........................ | G01S 17/89 |
| | | | | 701/450 |
| 2023/0195118 A1* | 6/2023 | Singh | ...................... | B63B 79/15 |
| | | | | 701/21 |
| 2023/0290055 A1* | 9/2023 | Sasaki | .................. | G01C 15/002 |
| 2023/0365123 A1* | 11/2023 | Yamaguchi | ............ | B60W 30/06 |
| 2024/0116437 A1* | 4/2024 | Khan | ....................... | G06T 3/40 |
| 2024/0116619 A1* | 4/2024 | Tomita | ................... | B63H 25/36 |

* cited by examiner

| REGION<br>DETERMINATION | FRONT/REAR | LEFT AND RIGHT | DIAGONAL |
|---|---|---|---|
| NO ALARM | NO DISPLAY | NO DISPLAY | NO DISPLAY |
| FIRST TYPE | ▭ | NO DISPLAY | ⌒ |
| SECOND TYPE | ▭▭ | ▮ | ⌒⌒ |

STEERING ASSISTANCE SYSTEM

BACKGROUND

Field of the Invention

The present invention relates to a steering assistance system.

Description of Related Art

In recent years, efforts have become active to provide access to a sustainable transportation system in which individuals in vulnerable positions among traffic participants, such as entry-level users, are taken into account (the specification of United States Patent Application, Publication No. 20200369351).

SUMMARY

Among transportation systems, in a case of operating a ship, there has been a large blind spot from the operator's seat, and this may make entry-level users feel uneasy. The present invention has been made in consideration of such circumstances, and one objective thereof is to provide a steering assistance system that makes it easy for anyone to operate a ship by providing visual assistance.

A steering assistance system according to the present invention employs the following configuration.

(1) A steering assistance system according to one aspect of this invention includes an imager capturing an image of surroundings of a waterborne moving body, a display displaying the image, an image processing unit processing the image captured by the imager, a determination unit determining whether or not a positional relationship between an object around the waterborne moving body and the waterborne moving body satisfies a predetermined condition on the basis of a result of processing the image, and a display control unit causing the display to display an image in which one or more virtual lines are superimposed on the image representing the surroundings of the waterborne moving body if the predetermined condition is determined to be satisfied, in which each of the one or more virtual lines is associated with one of at least four or more regions set to the front, rear, left, and right of the waterborne moving body, the determination unit determines whether or not the predetermined condition is satisfied for each of the regions, and the display control unit causes the display not to display the virtual line corresponding to a specific region if the predetermined condition is satisfied in the specific region and causes the display to display the virtual line corresponding to a non-specific region if the predetermined condition is satisfied in the non-specific region.

(2) In the above-described aspect (1), the predetermined condition may be that a distance between the waterborne moving body and the object is less than a threshold value.

(3) In the above-described aspect (1), the predetermined condition may be that a predicted contact time between the waterborne moving body and the object around the waterborne moving body is less than a second threshold value.

(4) In the above-described aspect (1), the predetermined condition may include a first predetermined condition and a second predetermined condition, the first predetermined condition may be one determined on the basis of being less than a first threshold value, the second predetermined condition may be one determined on the basis of being less than a second threshold value and may be less likely to be satisfied than the first predetermined condition, the virtual line may include a first type in which an outer virtual line is displayed if the first predetermined condition is satisfied and a second type in which the outer virtual line and an inner virtual line are displayed if the second predetermined condition is satisfied, and the display control unit may cause the display not to display the outer virtual line corresponding to the specific region if the first predetermined condition is satisfied in the specific region and may cause the display to display the outer virtual line and the inner virtual line corresponding to a region including the specific region if the second predetermined condition is satisfied in all the regions.

(5) In the above-described aspect (1), the specific region may be regions positioned on the left and right with respect to a traveling direction of the waterborne moving body.

(6) In the above-described aspect (4), the display control unit may cause the display to display the outer virtual line in a first color in a case of the first type, and may cause the display to display the outer virtual line and the inner virtual line in a second color in a case of the second type.

(7) In the above-described aspect (1), the display control unit may cause the display to display a direction line indicating a rudder angle of a propulsion machine included in the waterborne moving body to be superimposed on the image.

(8) In the above-described aspect (7), the display control unit may cause the display to display the direction line in a region on an inward side of the outer virtual line displayed on an outermost side.

(9) In the above-described aspect (8), the display control unit may cause the display to display a shift position in a display region of the waterborne moving body positioned inward of the virtual line in the image.

(10) In the above-described aspect (1), the display may display a distance marker when viewed from the waterborne moving body in a specific direction on the display.

(11) A steering assistance system according to one aspect of this invention includes an imager capturing an image of surroundings of a waterborne moving body, a display displaying the image, an image processing unit processing the image captured by the imager, a determination unit determining whether or not a positional relationship between an object around the waterborne moving body and the waterborne moving body satisfies a predetermined condition on the basis of a result of processing the image, and a display control unit causing the display to display an image in which one or more virtual lines are superimposed on the image representing the surroundings of the waterborne moving body if the predetermined condition is determined to be satisfied, in which each of the one or more virtual lines is associated with one of a plurality of regions with a virtual reference line obtained by extending a vertex of an outer edge outward when the waterborne moving body is viewed from above as a boundary, and the display control unit causes the display to display the virtual line corresponding to the region when the region satisfies the predetermined condition.

(12) In the above-described aspect (11), the plurality of regions may include a specific region and a non-specific region, and the display control unit may cause the display not to display the virtual line corresponding to the specific region if the predetermined condition is satisfied in the specific region, and may cause the display to display the virtual line corresponding to the non-specific region if the predetermined condition is satisfied in the non-specific region.

(13) In the above-described aspect (12), the predetermined condition may include a first predetermined condition and a second predetermined condition, the first predetermined condition may be one determined on the basis of being less than a first threshold value, the second predetermined condition may be one determined on the basis of being less than a second threshold value and may be less likely to be satisfied than the first predetermined condition, the virtual line may include a first type in which an outer virtual line is displayed if the first predetermined condition is satisfied and a second type in which the outer virtual line and an inner virtual line are displayed if the second predetermined condition is satisfied, and the display control unit may cause the display not to display the outer virtual line corresponding to the specific region in the specific region and may cause the display to display the outer virtual line and the inner virtual line corresponding to a region including the specific region in all the regions.

(14) In the above-described aspect (13), the display control unit may cause the display to display the outer virtual line in a first color in a case of the first type, and may cause the display to display the outer virtual line and the inner virtual line in a second color in a case of the second type.

(15) In the above-described aspect (11), the display control unit may cause the display to display a direction line indicating a rudder angle of a propulsion machine included in the waterborne moving body to be superimposed on the image.

(16) In the above-described aspect (15), the display control unit may cause the display to display the direction line in a region on an inward side of the outer virtual line displayed on an outermost side.

(17) In the above-described aspect (16), the display control unit may cause the display to display a shift position in a display region of the waterborne moving body positioned inward of the virtual line in the image.

(18) In the above-described aspect (11), the display may display a distance marker when viewed from the waterborne moving body in a specific direction on the display.

(19) A steering assistance system according to one aspect of this invention includes an imager capturing an image of surroundings of a waterborne moving body, a display displaying the image, an image processing unit converting the image captured by the imager into a top view, a determination unit recognizing an object around the waterborne moving body on the basis of the top view, thereby determining whether or not a distance between the waterborne moving body and the object around the waterborne moving body is less than a threshold value or determining whether or not a predicted contact time between the waterborne moving body and the object around the waterborne moving body is less than a threshold value, and a display control unit causing the display to display a virtual line to be superimposed on the top view on the basis of a result of the determination.

According to the aspects (1) to (19) described above, when the outer virtual line is made not to be displayed in a specific region, awareness of the operator regarding a potential contact with a surrounding object in a region of high necessity increases, and the operator can recognize a potential contact with the surrounding object at an early stage and can operate the waterborne moving body not to come into contact with the surrounding object.

DESCRIPTION OF EMBODIMENTS

Hereinafter, embodiments of a steering assistance system of the present invention will be described with reference to the drawings.

First Embodiment

Figure 1:
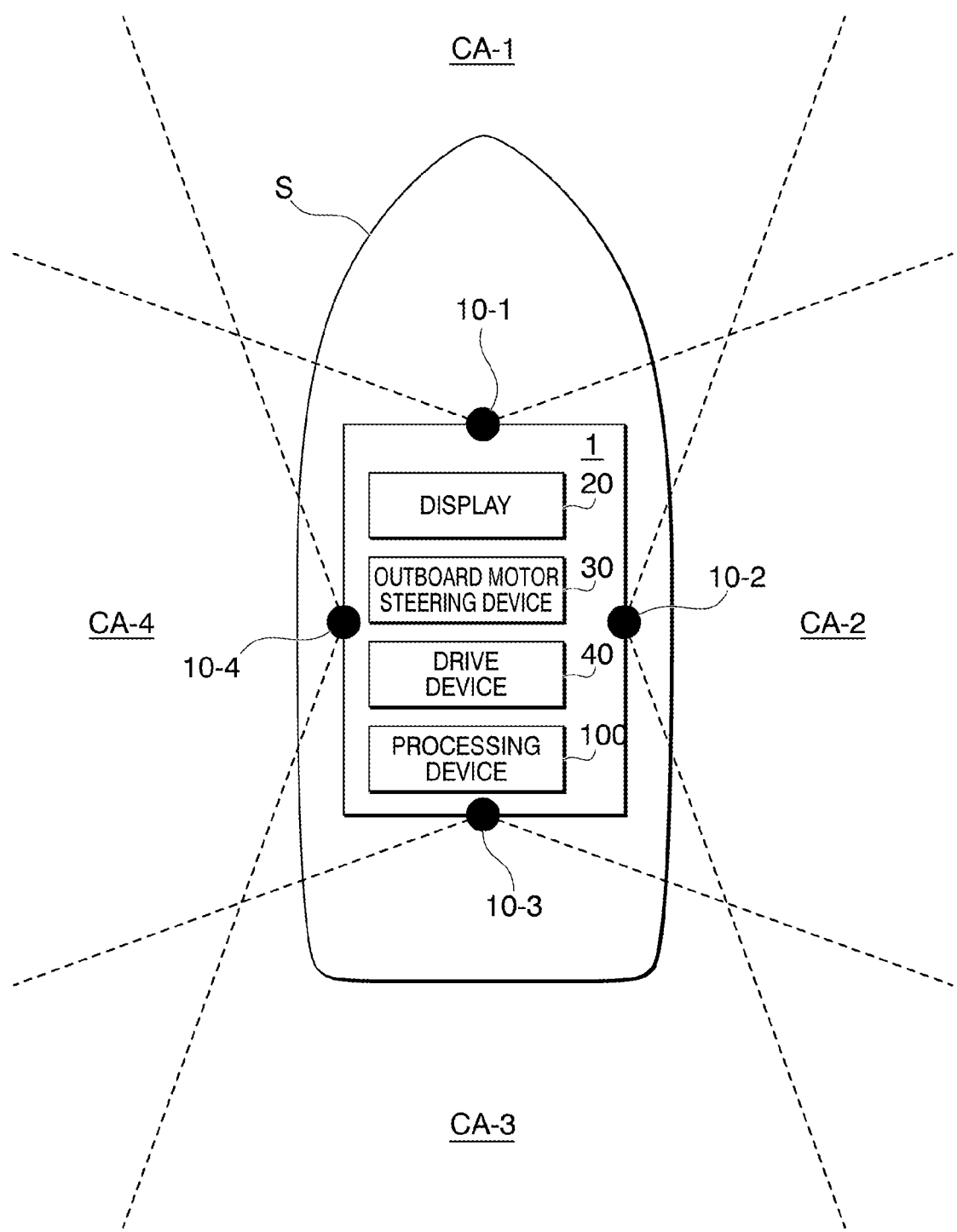
FIG. 1 is an overall view of a waterborne moving body.

FIG. 1 is an overall view of a waterborne moving body. A waterborne moving body S is, for example, a ship, a personal watercraft, or the like. A cabin of the waterborne moving body S includes imagers 10 therearound. A steering assistance system 1 is mounted on the waterborne moving body S. The steering assistance system 1 includes, for example, the imagers 10, a display 20, and a processing device 100. Also, for example, an outboard motor steering device 30 and a drive device 40 are mounted on the waterborne moving body S.

The imagers 10 are installed, for example, one at each of the front, rear, left, and right, and adjacent imagers 10 are disposed so that some of their imaging regions overlap. The imagers 10 may be attached to, for example, a distal end of the waterborne moving body S, left and right sides of a cockpit roof, and a rear part of the cockpit roof, or may be attached to a front wall, left and right lateral walls, and a rear wall. For example, a plurality of imagers 10 may be installed at each position. The imager 10 can capture images of surroundings of the waterborne moving body S, and can capture an image from a point at an arbitrary distance away from the waterborne moving body S to another point at a further arbitrary distance away therefrom. For example, the imager 10 can capture an image from a point at 30 [cm] away from the waterborne moving body S to a point at 30 [m] away therefrom. In FIG. 1, four imagers 10-1 to 10-4 are illustrated, and CA-1 to CA-4 respectively illustrate imaging ranges of the imagers.

The display 20 is a display that displays an image. A plurality of displays 20 may be installed in the waterborne moving body S. Also, a display surface of each of the displays 20 may be a flat surface or a curved surface. Also, a shape of an outline of the display surface of the display 20 may be a quadrangle, but is not limited to a quadrangle.

Figure 2:
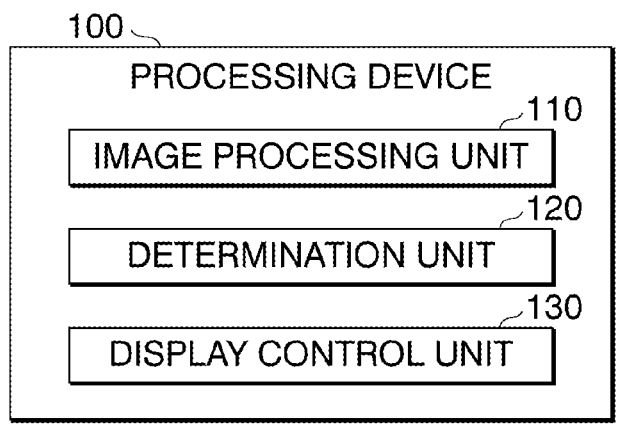
FIG. 2 is a configuration diagram of a processing device.

FIG. 2 is a configuration diagram of a processing device. The processing device 100 includes, for example, an image processing unit 110, a determination unit 120, and a display control unit 130. These components are realized by, for example, a hardware processor such as a central processing unit (CPU) executing a program (software). Some or all of these components may be realized by hardware (circuit unit including a circuitry) such as a large scale integration (LSI), an application specific integrated circuit (ASIC), a field-programmable gate array (FPGA), and a graphics processing unit (GPU), or may be realized by software and hardware in cooperation. The program may be stored in a storage device (storage device including a non-transitory storage medium) such as a hard disk drive (HDD) or flash memory in advance, or may be stored in a detachable storage medium (non-transitory storage medium) such as a DVD or a CD-ROM and installed by mounting the detachable storage medium on a drive device.

The image processing unit 110 performs processing of converting the images captured by the imagers 10 into a top view.

Here, calibration for converting to a top view will be described. An operator of the waterborne moving body S performs calibration on land or the like in advance. The operator installs a calibration board at a height of an actual draft of the waterborne moving body S and measures a coordinate of an installation point of the calibration board.

Figure 3:
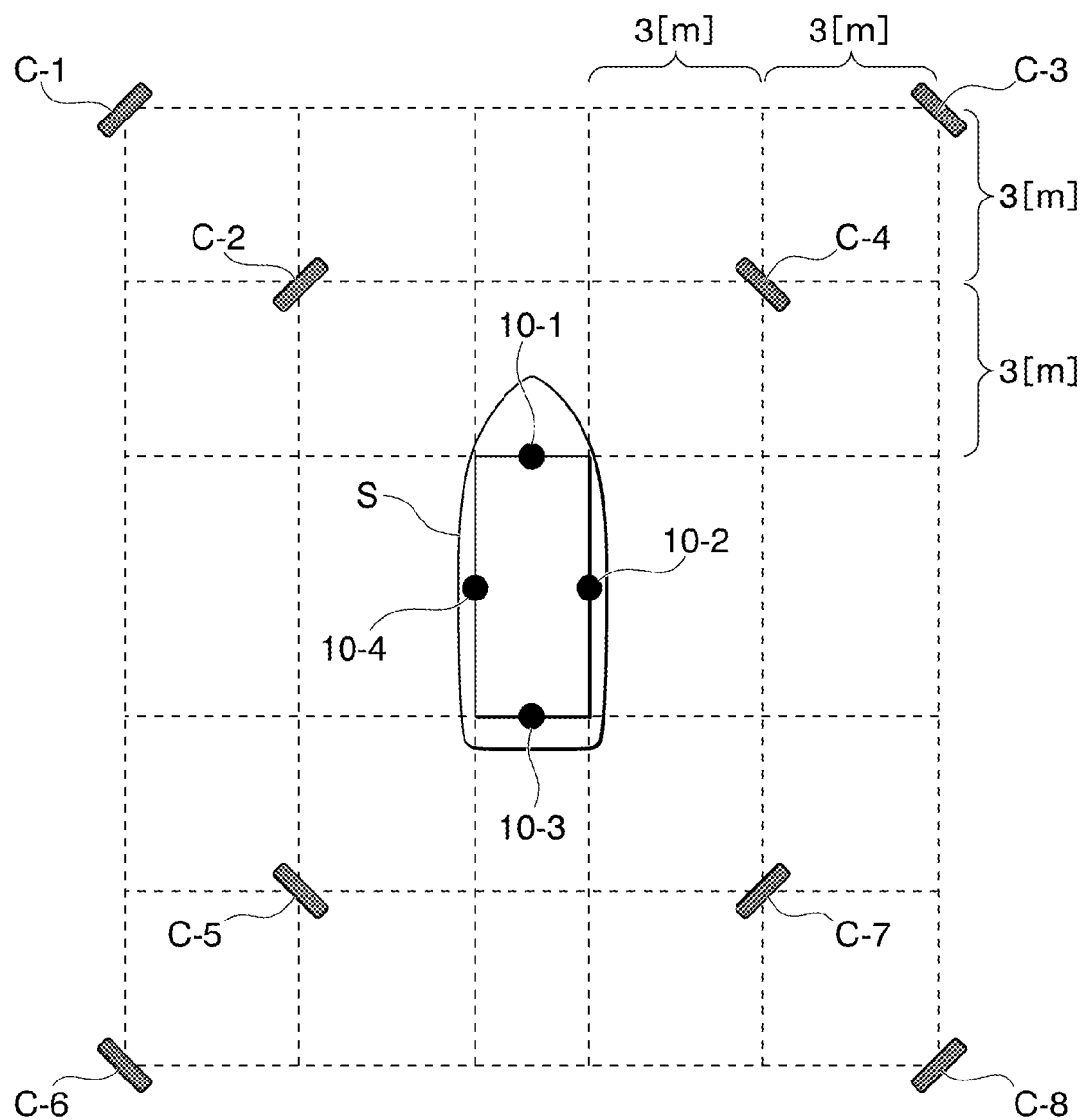
FIG. 3 illustrates an example of an installation point of a calibration board.

FIG. 3 illustrates an example of an installation point of the calibration board. The coordinate is divided by, for example, partitions of 3 [m]×3 [m] with the waterborne moving body S as a center. The waterborne moving body S includes, for example, four imagers 10. C-1 to C-8 are installation points of the calibration board. The operator captures images of surroundings of the waterborne moving body S using the four imagers 10. The captured images are stored in an electronic control unit (ECU) (not illustrated) and transferred to another device using a universal serial bus (USB) memory or the like. Another device is a computer device that can perform a calibration. The operator measures a coordinate of the calibration board in the image.

The operator calculates a three-dimensional coordinate using a principle of epipolar matching. Epipolar matching refers to one in which a virtual perpendicular line is drawn in a three-dimensional space from a coordinate on a plane of the imager 10 with a coordinate of the calibration board in a real space and a coordinate of the calibration board in the image as input information, and an intersection point of the virtual perpendicular line and a virtual perpendicular line from a coordinate on a plane of another imager 10 is defined as the three-dimensional coordinate. The operator installs information of the three-dimensional coordinate into the image processing unit 110, and thereby the image processing unit 110 can convert the images captured by the imagers 10 into a top view.

The determination unit 120 determines whether or not a positional relationship between an object around the waterborne moving body S and the waterborne moving body S satisfies a predetermined condition by using the top view converted by the image processing unit 110. The predetermined condition refers to, for example, a condition of a distance between the waterborne moving body S and an object therearound being less than a threshold value, a condition of a predicted contact time between the waterborne moving body S and the object therearound being less than a threshold value, or a condition configured by their logical product or logical sum.

For example, the determination unit 120 performs detection of a surrounding object by inputting an image (an image captured by the imager 10 may be used or a top view may be used) to a detection model that has been generated in advance using a method such as machine learning and has been learned to output presence and types of the object when the image is input. Also, the determination unit 120 recognizes the object around the waterborne moving body S by inputting the converted top view into a pre-trained learning model that has been learned to output a position of the object when the top view is input, and determines whether or not a positional relationship between the object around the waterborne moving body S and the waterborne moving body S satisfies the predetermined condition. When the converted top view is used as the input image, the number of images to be learned can be reduced. The surrounding object includes another waterborne moving body, a pier, a trailer, a person, a floating matter, or the like. The determination unit 120 detects a coordinate at which a surrounding object is present, and calculates a distance from the waterborne moving body S and a predicted contact time. The predicted contact time refers to a predicted time until the waterborne moving body S comes into contact with an object therearound when the waterborne moving body S continues to move in a traveling direction, and is obtained by dividing the distance by a relative speed. The determination unit 120 calculates the distance between the waterborne moving body S and the object therearound from the coordinate on the top view. The coordinate is indicated by, for example, a position of the point on a plane divided into grids of 10 [cm] per square.

The determination unit 120 performs a determination using, for example, a first threshold value and a second threshold value. The first threshold value and the second threshold value may be fixed values or variable values. The predetermined condition includes, for example, a first predetermined condition and a second predetermined condition. The determination unit 120 determines that the first predetermined condition is satisfied when the distance is less than the first threshold value, and determines that the second predetermined condition is satisfied when the distance is less than the second threshold value. Alternatively, the determination unit 120 determines that the first predetermined condition is satisfied when the predicted contact time is less than the first threshold value, and determines that the second predetermined condition is satisfied when the predicted contact time is less than the second threshold value. The second threshold value is smaller than the first threshold value, and therefore, the second predetermined condition is less likely to be satisfied than the first predetermined condition. In the following description, the predetermined condition is related to the distance, and the first threshold value and the second threshold value are each a threshold value for the distance. The determination unit 120 may determine that the predetermined condition is satisfied when, for example, the distance between the waterborne moving body S and an object therearound being less than the threshold value (for example, about 3 [m]) has elapsed for a certain period of time instead of making a determination instantaneously.

The determination unit 120 performs the above-described determination, for example, for each region obtained by dividing the top view into quarters including the front, rear, left, and right parts. The region to be divided may be divided into, for example, eighths including the front, back, left, right, and diagonal parts. The regions for determining the first predetermined condition and the second predetermined condition may be divided into parts of different numbers.

When the predetermined condition is determined to be satisfied, the display control unit 130 causes the display 20 to display an image in which one or more virtual lines are superimposed on the top view or an image representing the surroundings of the waterborne moving body S. Each of the one or more virtual lines is associated with one of the regions. For example, the display control unit 130 displays a virtual line of a first type when the first predetermined condition is satisfied, and displays a virtual line of a second type when the second predetermined condition is satisfied. The first type and second type will be described later.

The display control unit 130 causes the display 20 not to display the virtual line corresponding to a specific region when the predetermined condition is satisfied in the specific region, and causes the display 20 to display the virtual line corresponding to a non-specific region when the predetermined condition is satisfied in the non-specific region. The specific region refers to regions positioned on the left and right with respect to a traveling direction of the waterborne moving body S. Regions other than the specific region are referred to as the non-specific regions.

The virtual line includes an outer virtual line that is displayed when the first predetermined condition is satisfied, and an inner virtual line that is displayed when the second predetermined condition is satisfied. The display control unit 130 causes the display 20 not to display the outer virtual line corresponding to the specific region when the first predetermined condition is satisfied in the specific region, and causes the display 20 to display the outer virtual line and the inner virtual line corresponding to a region including the specific region when the second predetermined condition is satisfied in all the regions. For example, the virtual line of any shape may be set in an input unit (display or the like) depending on a shape of a ship, or the virtual line may be displayed by selecting from several types of preset shapes according to typical shapes of ships (V-hull, pontoon, runabout).

Figure 4:
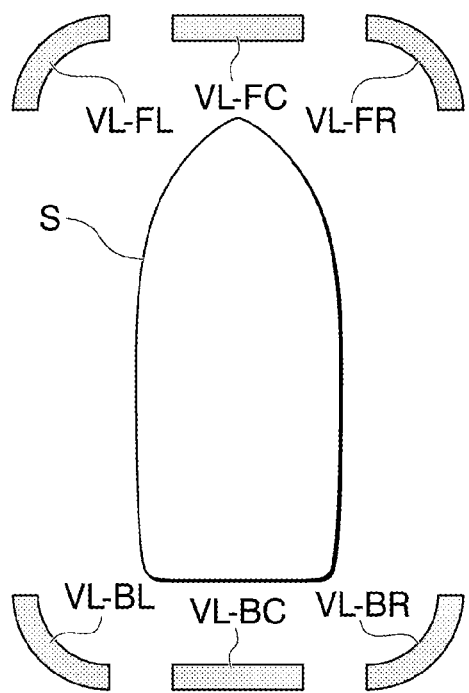
FIG. 4 is a view illustrating an example of a display of a first type.
Figure 5:
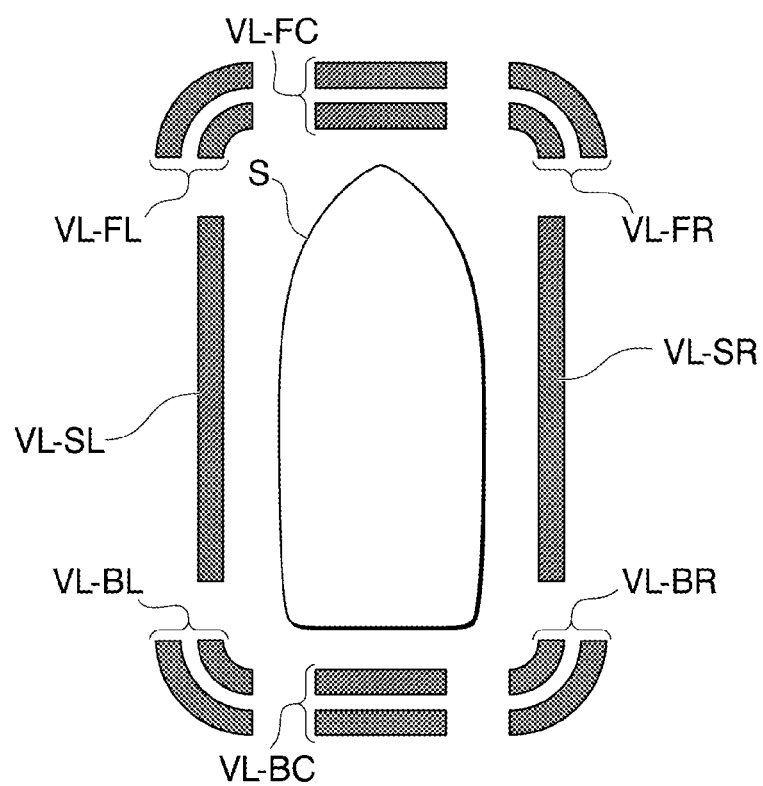
FIG. 5 is a view illustrating an example of a display of a second type.

The display control unit 130 causes the display 20 to display the outer virtual line in a first color when the first predetermined condition is satisfied, and causes the display 20 to display the outer virtual line and the inner virtual line in a second color when the second predetermined condition is satisfied. A state displayed in the first color is defined as a first type, and a state displayed in the second color is defined as a second type. FIG. 4 is a view illustrating an example of the display of the first type. FIG. 5 is a view illustrating an example of the display of the second type. The virtual lines illustrated in FIGS. 4 and 5 are referred to as VL-FL for a front-left virtual line, VL-FC for a front-center virtual line, VL-FR for a front-right virtual line, VL-SL for a left-lateral virtual line, VL-SR for a right-lateral virtual line, VL-BL for a rear-left virtual line, VL-BC for a rear-center virtual line, and VL-BR for a rear-left virtual line. FIGS. 4 and 5 are examples in which the number of regions in which the first predetermined condition is determined is six, and the number of regions in which the second predetermined condition is determined is eight. In FIGS. 4 and 5, the virtual lines are displayed assuming that the predetermined conditions are determined to be satisfied in all regions. In FIGS. 4 and 5, the display control unit 130 dually displays the outer virtual line and the inner virtual line, but for example, the display control unit 130 may triply display the virtual lines. For example, the display control unit 130 may display the first color and the second color of the virtual lines in the same color. For example, the display control unit 130 may display the first type and the second type by varying a density and a thickness of the line.

Figure 6:
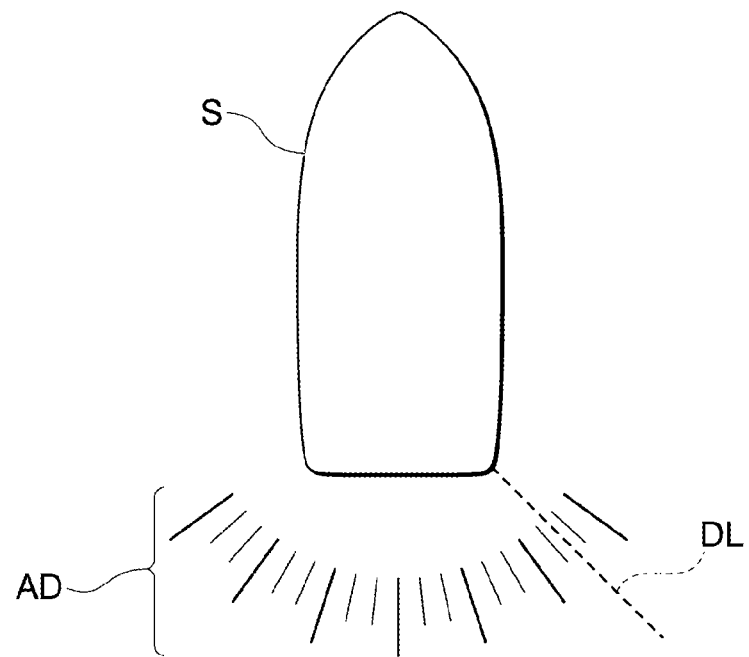
FIG. 6 is a view illustrating an example of a direction line.

The display control unit 130 further causes the display 20 to display a top view including a direction line indicating a rudder angle of a propulsion machine included in the waterborne moving body S. The propulsion machine is operated by an outboard motor steering device 30. FIG. 6 is a view illustrating an example of the direction line. The direction line is defined as DL. The display control unit 130 displays the direction line DL to be superimposed on an angle AD of the direction line. The operator operates the outboard motor steering device 30 to turn in a left direction to control the propulsion machine to move in the left direction, and the direction line indicates a propulsion direction of the waterborne moving body S. The display control unit 130 causes the display 20 to display the direction line DL in a region on an inward side of the outer virtual line displayed on an outermost side. The operator may, for example, transmit an amount of displacement of the outboard motor steering device 30 to an external device via controller region network (CAN) communications or the like, the determination unit 120 may recognize the propulsion machine using, for example, the top view image, and the display control unit 130 may cause the display 20 to display the superimposed lines. The direction line DL may, for example, directly represent an angle of the propulsion machine, or may also be a line converted into a predicted propulsion direction based on external disturbances (wind or waves).

Figure 7:
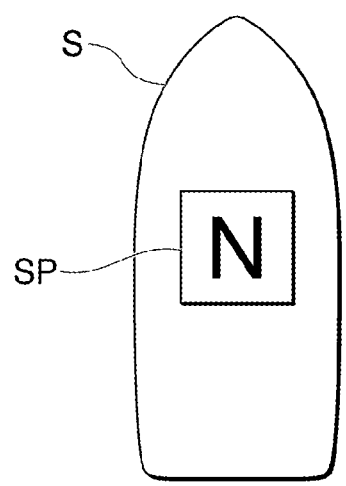
FIG. 7 is a view illustrating an example of a display of a shift position.

The display control unit 130 causes the display 20 to display a shift position to be superimposed on the display region of the waterborne moving body S in the top view. If the operator operates the outboard motor steering device 30 to change the shift position, the display control unit 130 outputs a top view in which the shift position is drawn to be superimposed on the waterborne moving body S to the display 20. FIG. 7 is a view illustrating an example of a display of the shift position. The shift position is defined as SP. While the shift position SP includes, for example, a forward F, a neutral N, a reverse R, and the like, all of them may be displayed, or only the specific shift position SP may be displayed. The specific shift position SP may be, for example, the neutral N, or may be a plurality of shift positions.

Figure 8:
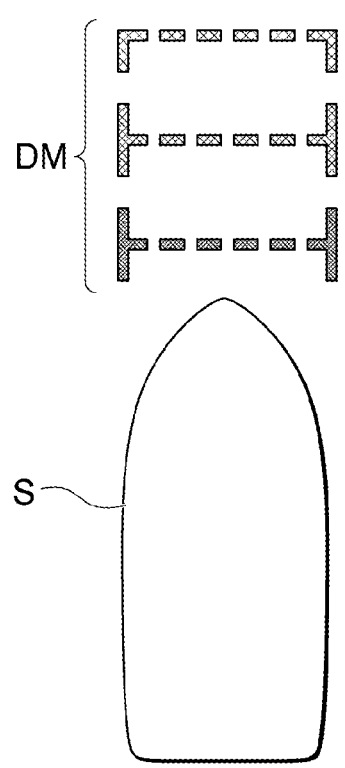
FIG. 8 is a view illustrating an example of a display of a distance marker.

The display control unit 130 causes the display 20 to display a top view including a distance marker as viewed from the waterborne moving body S in a specific direction. The distance marker is displayed to show a distance farther than the virtual line, and has a role of making it easy to understand a distance between the waterborne moving body S and an object therearound before the virtual line is displayed. The determination unit 120 calculates a coordinate, for example, every 5 [m] from the coordinate on the top view. The display control unit 130 draws a distance marker on the top view on the basis of the calculated coordinate and causes the display 20 to display the distance marker. FIG. 8 is a view illustrating an example of a display of the distance marker. The distance marker is defined as DM. An interval between the distance markers DM may be set, for example, arbitrarily, and an interval between the distance markers DM farther from the waterborne moving body S may be set larger than an interval between the distance markers DM closer to the waterborne moving body S. The distance marker DM may be displayed, for example, only in the front, or may be displayed in the front, rear, left, and right.

Figure 9:
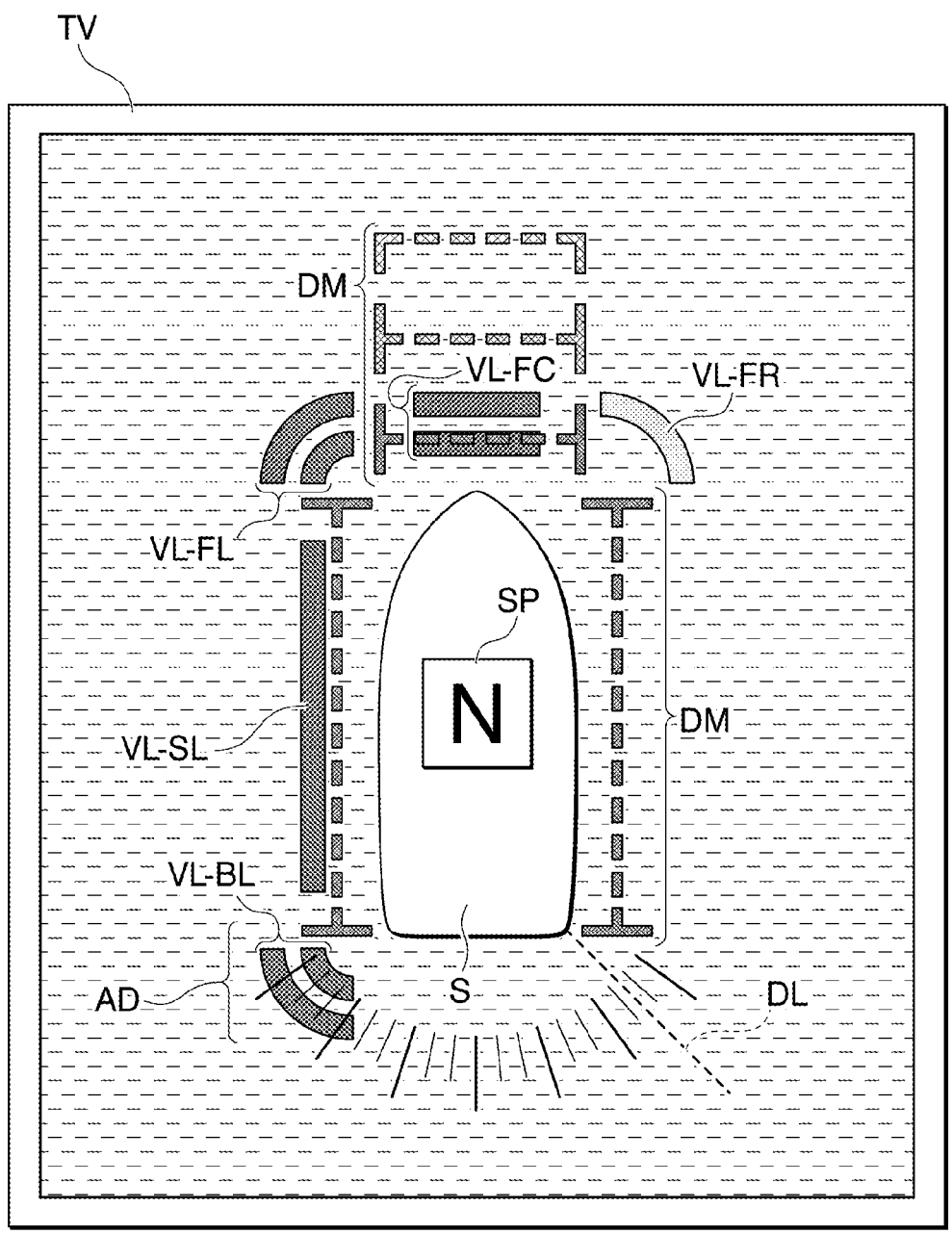
FIG. 9 is an example of a top view displayed on a display.
Figure 10:
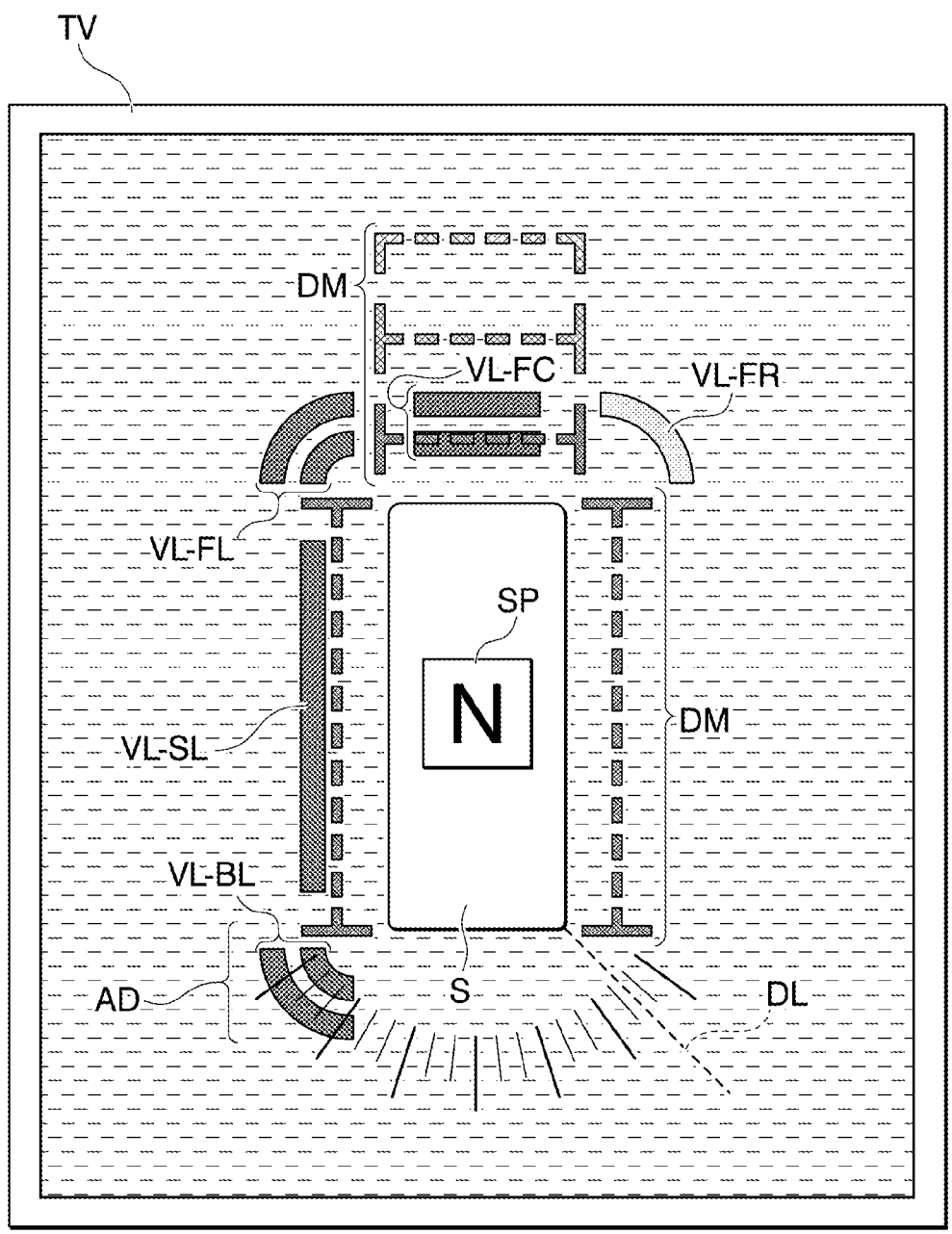
FIG. 10 is an example of the top view displayed on the display when a shape of the waterborne moving body S is a pontoon.

FIG. 9 is an example of a top view displayed on the display. FIG. 10 is an example of the top view displayed on the display when a shape of the waterborne moving body S is a pontoon. Since the waterborne moving body S on a top view TV approaches a pier, the virtual line is displayed with VL-FR in the first type, and VL-FL, VL-FC, VL-SL, and VL-BL in the second type. Since the shift position SP is neutral N, "N" is drawn in the display region of the waterborne moving body S. Since the waterborne moving body S is controlled so that the left direction toward the pier is the traveling direction, the direction line DL indicating the rudder angle is drawn obliquely to the right. The distance marker DM is drawn in the front, left, and right.

Figure 11:
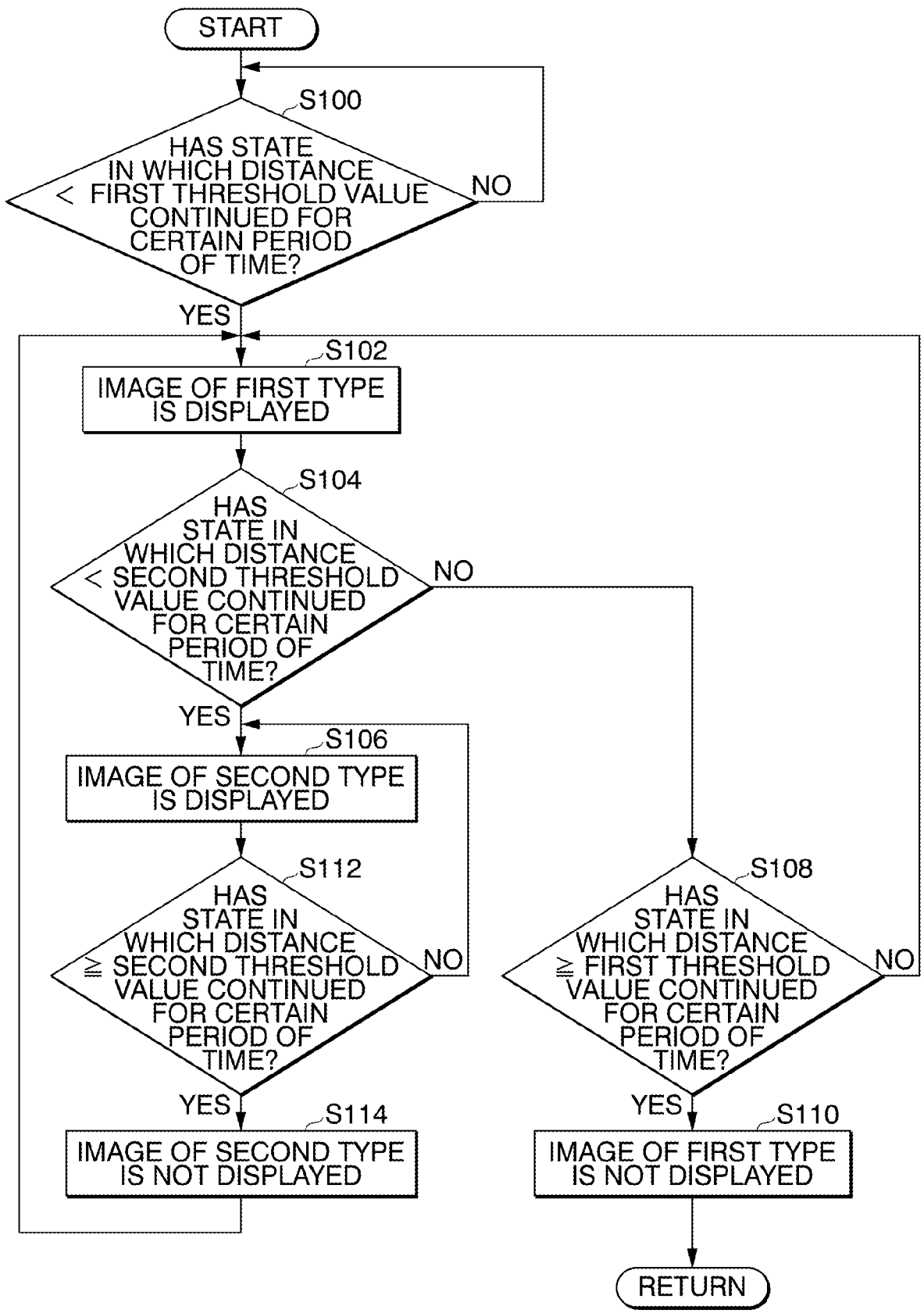
FIG. 11 is a flowchart showing an example of an operation of a determination unit.

FIG. 11 is a flowchart showing an example of an operation of the determination unit. In the present flowchart, the first threshold value is set to 3 [m], the second threshold value is set to 1.5 [m], and the certain period of time is set to 0.3 [seconds]. Also, in the present flowchart, the virtual line is configured to be displayed when the distance being less than the threshold value has continued for a certain period of time, but the virtual line may be displayed immediately after the distance becomes less than the threshold value without waiting for the elapse of certain period of time. In FIG. 11, determination by the determination unit 120 is performed for each region of each virtual line.

The determination unit 120 determines whether or not the distance being less than the first threshold value has continued for a certain period of time (step S100).

In the processing of step S100, if it is determined that the distance being less than the first threshold value has continued for a certain period of time, the display control unit 130 causes the display 20 to display an image of the first type (step S102).

In the processing of step S100, if it is determined that the distance being less than the first threshold value has not continued for a certain period of time, the processing of step S100 is repeated again.

In the processing of step S102, after the virtual line of the first type is displayed, the determination unit 120 determines whether or not the distance being less than the second threshold value has continued for a certain period of time (step S104).

In the processing of step S104, if it is determined that the distance being less than the second threshold value has continued for a certain period of time, the display control unit 130 causes the display 20 to display an image of the second type (step S106).

In the processing of step S104, if it is determined that the distance being less than the second threshold value has not continued for a certain period of time, the determination unit 120 determines whether or not the distance being equal to or larger than the first threshold value has continued for a certain period of time (step S108).

In the processing of step S108, if it is determined that the distance being equal to or larger than the first threshold value has continued for a certain period of time, the display control unit 130 causes the display 20 not to display the image of the first type (step S110). After the processing of step S110, the processing returns to step S100 of the present flowchart.

In the processing of step S108, if it is determined that the distance being equal to or larger than the first threshold value has not continued for a certain period of time, the processing returns to step S102, and the display control unit 130 causes the display 20 to display the image of the first type.

After the processing in step S106, the determination unit 120 determines whether or not the distance being equal to or larger than the second threshold value has continued for a certain period of time (step S112).

In the processing of step S112, if it is determined that the distance being equal to or larger than the second threshold value has continued for a certain period of time, the image of the second type is not displayed on the display 20 (step S114). After the processing of step S114, the processing returns to step S102, and the display control unit 130 causes the display 20 to display the image of the first type.

Figures 12, 13:
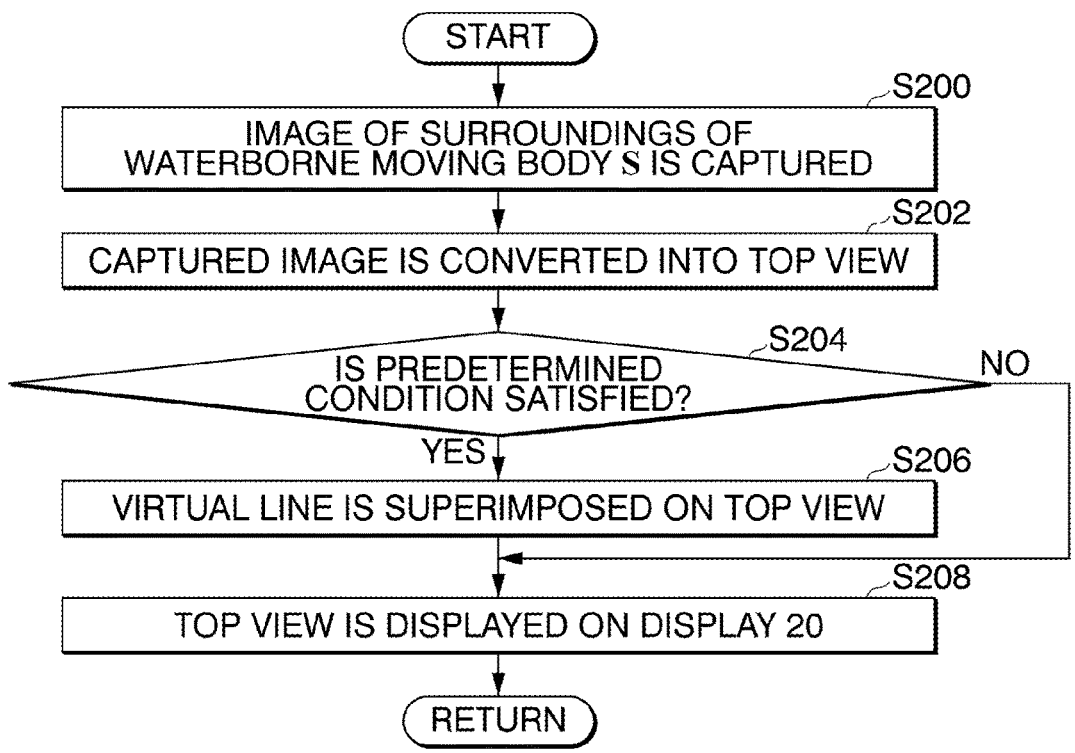
FIG. 12 is a table showing virtual lines that the display control unit displays on the display according to combinations of determination results and regions.
FIG. 13 is a flowchart showing an example of an operation of a steering assistance system.

FIG. 12 is a table showing virtual lines that the display control unit displays on the display according to combinations of determination results and regions. If there is no alarm, no virtual line is displayed, regardless of it being the front/rear, left and right, or diagonal regions. When the first type is displayed, virtual lines of the first type are displayed in the front/rear regions and diagonal regions, but not displayed in the left and right regions. When the second type is displayed, virtual lines of the second type are displayed in the front/rear, left and right, and diagonal regions.

FIG. 12 is a flowchart showing an example of an operation of the steering assistance system. In the operation of the present flowchart, it is assumed that calibration has been completed in advance.

The imager 10 captures an image of surroundings of the waterborne moving body S (step S200).

The image processing unit 110 converts the image captured in step S200 into a top view (step S202).

The determination unit 120 determines whether or not a predetermined condition is satisfied on the basis of the top view processed in step S202 (step S204).

In the processing of step S204, if it is determined that the predetermined condition is satisfied, the display control unit 130 superimposes a virtual line according to the determination result on the top view (step S206).

The display 20 displays the top view on which the virtual line is superimposed in the processing of step S206 (step S208). After the processing in step S208, the processing returns to step S200 of the present flowchart.

In the processing of step S204, if it is determined that the predetermined condition is not satisfied, the processing moves to step S208, and the display 20 displays a top view with nothing superimposed on it (step S208). After the processing in step S208, the processing returns to step S200 of the present flowchart.

According to the steering assistance system 1 of the first embodiment described above, when the outer virtual line is made not to be displayed in a specific region, awareness of the operator regarding a potential contact with a surrounding object in a region of high necessity increases, and the operator can recognize a potential contact with the surrounding object at an early stage and can operate the waterborne moving body S not to come into contact with the surrounding object. On the other hand, the inner virtual line is displayed in all regions including the specific regions, and this can assist positioning of the waterborne moving body S during, for example, docking or the like. The steering assistance system 1 can appropriately notify the operator of approaching the surrounding object by changing colors displaying virtual lines of the first type and second type.

Also, the steering assistance system 1 displays the direction line to be superimposed in a region on an inward side of the outer virtual line, and thereby the operator can grasp a traveling direction of the waterborne moving body S while being aware of approaching the surrounding object. When the shift position is displayed, the steering assistance system 1 can ascertain detection of the surrounding object due to the display of the virtual line and the shift position in the same image during docking, and the operator can reduce an amount of movement in the line of sight, thereby making quicker steering decisions. When the distance marker is displayed to be superimposed, the steering assistance system 1 can recognize a sense of distance from the surrounding object that is far away before the virtual line is displayed.

Second Embodiment

The second embodiment has the same configuration as the first embodiment, but differs in a method of dividing regions. A steering assistance system 1 of the second embodiment is divided into a plurality of regions with virtual reference lines obtained by extending vertexes of an outer edge outward when the waterborne moving body S is viewed from above as boundaries, and virtual lines are respectively associated with the regions. Also in the second embodiment, as in the first embodiment, a display control unit 130 displays virtual lines of a first type and a second type.

Figure 14:
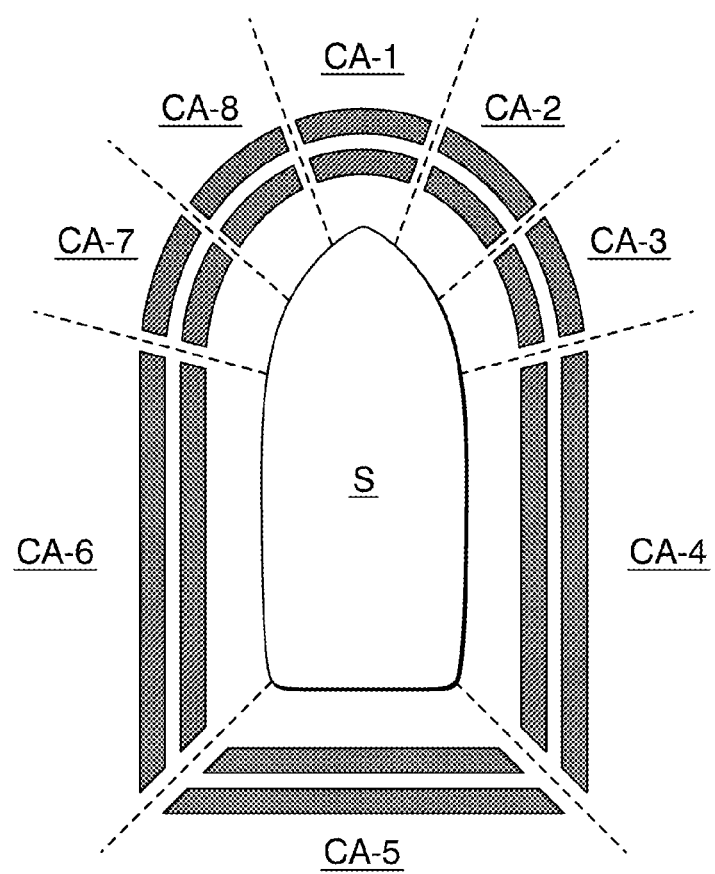
FIG. 14 is a view illustrating an example of a display of virtual lines in a second embodiment.

FIG. 14 is a view illustrating an example of a display of virtual lines in the second embodiment. In FIG. 13, virtual reference lines in dotted lines extend from vertexes of an outer edge of the waterborne moving body S to divide the waterborne moving body S into eight regions of CA-1 to CA-8 due to the virtual reference lines. The display control unit 130 causes a display 20 to display the virtual lines of the second type associated with the divided regions, respectively.

According to the second embodiment described above, when the region is divided for each vertex of the outer edge of the waterborne moving body S, the operator can more easily visually recognize from which direction an object around the waterborne moving body S approaches the waterborne moving body S.

(A)

A steering assistance system including:
an imager capturing an image of surroundings of a waterborne moving body;
a display displaying the image;
a storage medium storing computer-readable instructions; and
a processor connected to the storage medium, in which the processor executes the computer-readable instructions to:
process the image captured by the imager;
determine whether or not a positional relationship between an object around the waterborne moving body and the waterborne moving body satisfies a predetermined condition on the basis of a result of processing the image; and
cause the display to display an image in which one or more virtual lines are superimposed on the image representing the surroundings of the waterborne moving body if the predetermined condition is determined to be satisfied,
each of the one or more virtual lines is associated with one of at least four or more regions set to the front, rear, left, and right of the waterborne moving body, and
the processor:
determines whether or not the predetermined condition is satisfied for each of the regions at the time of the determination; and
causes the display not to display the virtual line corresponding to a specific region if the predetermined condition is satisfied in the specific region and causes the display to display the virtual line corresponding to a non-specific region if the predetermined condition is satisfied in the non-specific region.

(B)

A steering assistance system including:
an imager capturing an image of surroundings of a waterborne moving body;
a display displaying the image;
a storage medium storing computer-readable instructions; and
a processor connected to the storage medium, in which the processor executes the computer-readable instructions to:
process the image captured by the imager;
determine whether or not a positional relationship between an object around the waterborne moving body and the waterborne moving body satisfies a predetermined condition on the basis of a result of processing the image; and
cause the display to display an image in which one or more virtual lines are superimposed on the image representing the surroundings of the waterborne moving body if the predetermined condition is determined to be satisfied,
each of the one or more virtual lines is associated with one of a plurality of regions with a virtual reference line obtained by extending a vertex of an outer edge outward when the waterborne moving body is viewed from above as a boundary, and
the processor causes the display to display the virtual line corresponding to the region in the region when the region satisfies the predetermined condition.

(C)

A steering assistance system including:
an imager capturing an image of surroundings of a waterborne moving body;
a display displaying the image;
a storage medium storing computer-readable instructions; and
a processor connected to the storage medium, in which the processor executes the computer-readable instructions to:
convert the image captured by the imager into a top view;
recognize an object around the waterborne moving body on the basis of the top view to determine whether or not a distance between the waterborne moving body and the object around the waterborne moving body is less than a threshold value or determine a predicted contact time between the waterborne moving body and the object around the waterborne moving body is less than a threshold value; and
cause the display to display a virtual line to be superimposed on the top view on the basis of a result of the determination.

The embodiment described above can also be expressed as follows.

(D)

A steering assistance method, which is executed by a processor of a steering assistance system including an imager capturing an image of surroundings of a waterborne moving body and a display displaying the image, the steering assistance method including:

processing the image captured by the imager;

determining whether or not a positional relationship between an object around the waterborne moving body and the waterborne moving body satisfies a predetermined condition on the basis of a result of the processing; and causing the display to display one or more virtual lines to be superimposed on the image representing the surroundings of the waterborne moving body if the predetermined condition is determined to be satisfied, in which each of the one or more virtual lines is associated with one of at least four or more regions set to the front, rear, left, and right of the waterborne moving body, the determining includes determining whether or not the predetermined condition is satisfied for each of the regions, and the displaying on the display includes not displaying the virtual line if the predetermined condition is satisfied in a specific region, and displaying the virtual line if the predetermined condition is satisfied in a non-specific region.

(E)

A steering assistance method, which is executed by a processor of a steering assistance system including an imager capturing an image of surroundings of a waterborne moving body and a display displaying the image, the steering assistance method including:

processing the image captured by the imager;

determining whether or not a positional relationship between an object around the waterborne moving body and the waterborne moving body satisfies a predetermined condition on the basis of a result of the processing; and causing the display to display a virtual line to be superimposed on the image representing the surroundings of the waterborne moving body if the predetermined condition is determined to be satisfied, in which the virtual line is associated with one of a plurality of regions with a virtual reference line obtained by extending a vertex of an outer edge outward when the waterborne moving body is viewed from above as a boundary, and the displaying on the display includes displaying the virtual line corresponding to the region on the display if the region satisfies the predetermined condition.

Although embodiments for implementing the present invention have been described above, the present invention is not limited to these embodiments at all, and various modifications and substitutions can be made within a range not departing from the gist of the present invention.

What is claimed is:

1. A steering assistance system comprising:
a processor that executes instructions to perform operations comprising:
capturing an image of surroundings of a waterborne moving body;
displaying the image to a display device;
processing the image;
determining whether or not a positional relationship between an object around the waterborne moving body and the waterborne moving body satisfies a predetermined condition on a basis of the processing of the image; and
causing the display device to display an image in which one or more virtual lines are superimposed on the image representing the surroundings of the waterborne moving body if the predetermined condition is determined to be satisfied, wherein
each of the one or more virtual lines is associated with one of at least four or more regions set to the front, rear, left, and right of the waterborne moving body,
determining whether or not the predetermined condition is satisfied for each of the regions, and
causing the display device not to display the virtual line corresponding to a specific region if the predetermined condition is satisfied in the specific region and causing the display device to display the virtual line corresponding to a non-specific region if the predetermined condition is satisfied in the non-specific region.

2. The steering assistance system according to claim 1, wherein the predetermined condition is that a distance between the waterborne moving body and the object is less than a threshold value.

3. The steering assistance system according to claim 1, wherein the predetermined condition is that a predicted contact time between the waterborne moving body and the object around the waterborne moving body is less than a second threshold value.

4. The steering assistance system according to claim 1, wherein
the predetermined condition includes a first predetermined condition and a second predetermined condition,
the first predetermined condition is one determined on a basis of being less than a first threshold value,
the second predetermined condition is one determined on a basis of being less than a second threshold value and is less likely to be satisfied than the first predetermined condition,
the virtual line includes a first type in which an outer virtual line is displayed if the first predetermined condition is satisfied and a second type in which the outer virtual line and an inner virtual line are displayed if the second predetermined condition is satisfied, and
causing the display device not to display the outer virtual line corresponding to the specific region if the first predetermined condition is satisfied in the specific region and causing the display device to display the outer virtual line and the inner virtual line corresponding to a region including the specific region if the second predetermined condition is satisfied in all the regions.

5. The steering assistance system according to claim 1, wherein the specific region is regions positioned on the left and right with respect to a traveling direction of the waterborne moving body.

6. The steering assistance system according to claim 4, wherein the operations further comprising causing the display device to display the outer virtual line in a first color in a case of the first type, and causing the display device to display the outer virtual line and the inner virtual line in a second color in a case of the second type.

7. The steering assistance system according to claim 1, wherein the operations further comprising causing the display device to display a direction line indicating a rudder angle of a propulsion machine included in the waterborne moving body to be superimposed on the image.

8. The steering assistance system according to claim 7, wherein the operations further comprising causing the display device to display the direction line in a region on an inward side of the outer virtual line displayed on an outermost side.

9. The steering assistance system according to claim 8, wherein the operations further comprising causing the display device to display a shift position in a display region of the waterborne moving body positioned inward of the virtual line in the image.

10. The steering assistance system according to claim 1, wherein the operations further comprising causing the
display device to display a distance marker when viewed from the waterborne moving body in a specific direction on the display device.

11. A steering assistance system comprising:
a processor that executes instructions to perform operations, comprising:
capturing an image of surroundings of a waterborne moving body;
displaying the image to a display device;
processing the image;
determining whether or not a positional relationship between an object around the waterborne moving body and the waterborne moving body satisfies a predetermined condition on a basis of the processing of the image; and
causing the display device to display an image in which one or more virtual lines are superimposed on the image representing the surroundings of the waterborne moving body if the predetermined condition is determined to be satisfied, wherein
each of the one or more virtual lines is associated with one of a plurality of regions with a virtual reference line obtained by extending a vertex of an outer edge outward when the waterborne moving body is viewed from above as a boundary, and
causing the display device to display the virtual line corresponding to the region when the region satisfies the predetermined condition.

12. The steering assistance system according to claim 11, wherein
the plurality of regions include a specific region and a non-specific region, and
causing the display device not to display the virtual line corresponding to the specific region if the predetermined condition is satisfied in the specific region, and causing the display device to display the virtual line corresponding to the non-specific region if the predetermined condition is satisfied in the non-specific region.

13. The steering assistance system according to claim 12, wherein
the predetermined condition includes a first predetermined condition and a second predetermined condition,
the first predetermined condition is one determined on a basis of being less than a first threshold value,
the second predetermined condition is one determined on a basis of being less than a second threshold value and is less likely to be satisfied than the first predetermined condition,
the virtual line includes a first type in which an outer virtual line is displayed if the first predetermined condition is satisfied and a second type in which the outer virtual line and an inner virtual line are displayed if the second predetermined condition is satisfied, and
causing the display device not to display the outer virtual line corresponding to the specific region in the specific region and causing the display device to display the outer virtual line and the inner virtual line corresponding to a region including the specific region in all the regions.

14. The steering assistance system according to claim 13, wherein the operations further comprising causing the display device to display the outer virtual line in a first color in a case of the first type, and causing the display device to display the outer virtual line and the inner virtual line in a second color in a case of the second type.

15. The steering assistance system according to claim 11, wherein the operations further comprising causing the display device to display a direction line indicating a rudder angle of a propulsion machine included in the waterborne moving body to be superimposed on the image.

16. The steering assistance system according to claim 15, wherein the operations further comprising causing the display device to display the direction line in a region on an inward side of the outer virtual line displayed on an outermost side.

17. The steering assistance system according to claim 16, wherein the operations further comprising causing the display device to display a shift position in a display region of the waterborne moving body positioned inward of the virtual line in the image.

18. The steering assistance system according to claim 11, wherein the operations further comprise causing the display device to display a distance marker when viewed from the waterborne moving body in a specific direction on the display device.

19. A steering assistance system comprising:
a processor that executes instructions to perform operations, comprising:
capturing an image of surroundings of a waterborne moving body;
displaying the image to a display device;
converting the image into a top view;
recognizing an object around the waterborne moving body by inputting the converted top view into a pre-trained learning model that has been learned to output a position of an object when the top view is input, thereby determining whether or not a distance between the waterborne moving body and the object around the waterborne moving body is less than a threshold value or determining whether or not a predicted contact time between the waterborne moving body and the object around the waterborne moving body is less than a threshold value; and
causing the display device to display a virtual line to be superimposed on the top view on a basis of a result of the determination.

* * * * *